(12) United States Patent
Jiang et al.

(10) Patent No.: US 9,762,090 B2
(45) Date of Patent: Sep. 12, 2017

(54) HIGH EFFICIENCY GATE DRIVER FOR WIRELESS POWER TRANSMISSION

(71) Applicant: Avago Technologies General IP (Singapore) Pte. Ltd., Singapore (SG)

(72) Inventors: Bing Jiang, Cerritos, CA (US); John Walley, Ladera Ranch, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 133 days.

(21) Appl. No.: 14/530,134

(22) Filed: Oct. 31, 2014

(65) Prior Publication Data

US 2016/0087481 A1    Mar. 24, 2016

Related U.S. Application Data

(60) Provisional application No. 62/054,744, filed on Sep. 24, 2014.

(51) Int. Cl.
*H02J 7/00* (2006.01)
*H02J 50/10* (2016.01)
*H02J 50/70* (2016.01)

(52) U.S. Cl.
CPC ............... *H02J 50/10* (2016.02); *H02J 50/70* (2016.02)

(58) Field of Classification Search
CPC ........ H02J 7/025; H01F 38/14; Y02T 90/122; B60L 11/182; Y02E 60/12
USPC ........................................................ 320/108
See application file for complete search history.

(56) References Cited

U.S. PATENT DOCUMENTS

| | | | | |
|---|---|---|---|---|
| 2005/0122183 A1* | 6/2005 | Luu | ....................... | H03F 1/0227 332/109 |
| 2008/0150634 A1* | 6/2008 | Koudymov | ........... | H03F 3/2178 330/251 |
| 2011/0102084 A1* | 5/2011 | Kim | ....................... | H03F 1/3205 330/253 |
| 2011/0115430 A1* | 5/2011 | Saunamaki | ............. | H02J 5/005 320/108 |
| 2015/0061579 A1* | 3/2015 | Katsunaga | ............... | H03H 7/40 320/108 |

* cited by examiner

*Primary Examiner* — Arun Williams
(74) *Attorney, Agent, or Firm* — Sterne, Kessler, Goldstein & Fox P.L.L.C.

(57) ABSTRACT

A wireless transmitter is described herein that provides power wirelessly to an apparatus with high efficiency. For example, the wireless power transmitter may include a class E amplifier that is used as a gate driver for a main power amplifier. This advantageously enables power to be transmitted wirelessly with a 100% theoretical power efficiency and with minimal power loss. Furthermore, electromagnetic interference (EMI) issues are reduced because only low orders of harmonics are applied to the gate of the main power amplifier. A system that incorporates such a wireless transmitter and methods of operating the same are also described herein.

20 Claims, 6 Drawing Sheets

HIGH EFFICIENCY GATE DRIVER FOR WIRELESS POWER TRANSMISSION

CROSS REFERENCE TO RELATED APPLICATION

This application claims priority to U.S. Provisional Application Ser. No. 62/054,744, filed Sep. 24, 2014, the entirety of which is incorporated by reference herein.

BACKGROUND

Technical Field

The embodiments described herein generally relate to systems and methods for wireless power transfer.

Description of Related Art

A gate driver is a power amplifier that accepts a low-power input from a controlled source and produces a high-current drive input for the gate of a high-power amplifier transistor. Traditional gate drivers have several shortcomings. For example, such gate drivers suffer from high power loss and output signals that are not clean (e.g., they are full of harmonics). These issues are particularly significant when such gate drivers are used for wireless power transfer applications. This is because high efficiency and low emission are the basic requirements for such applications.

BRIEF SUMMARY

Methods, systems, and apparatuses are described for wireless power transfer, substantially as shown in and/or described herein in connection with at least one of the figures, as set forth more completely in the claims

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
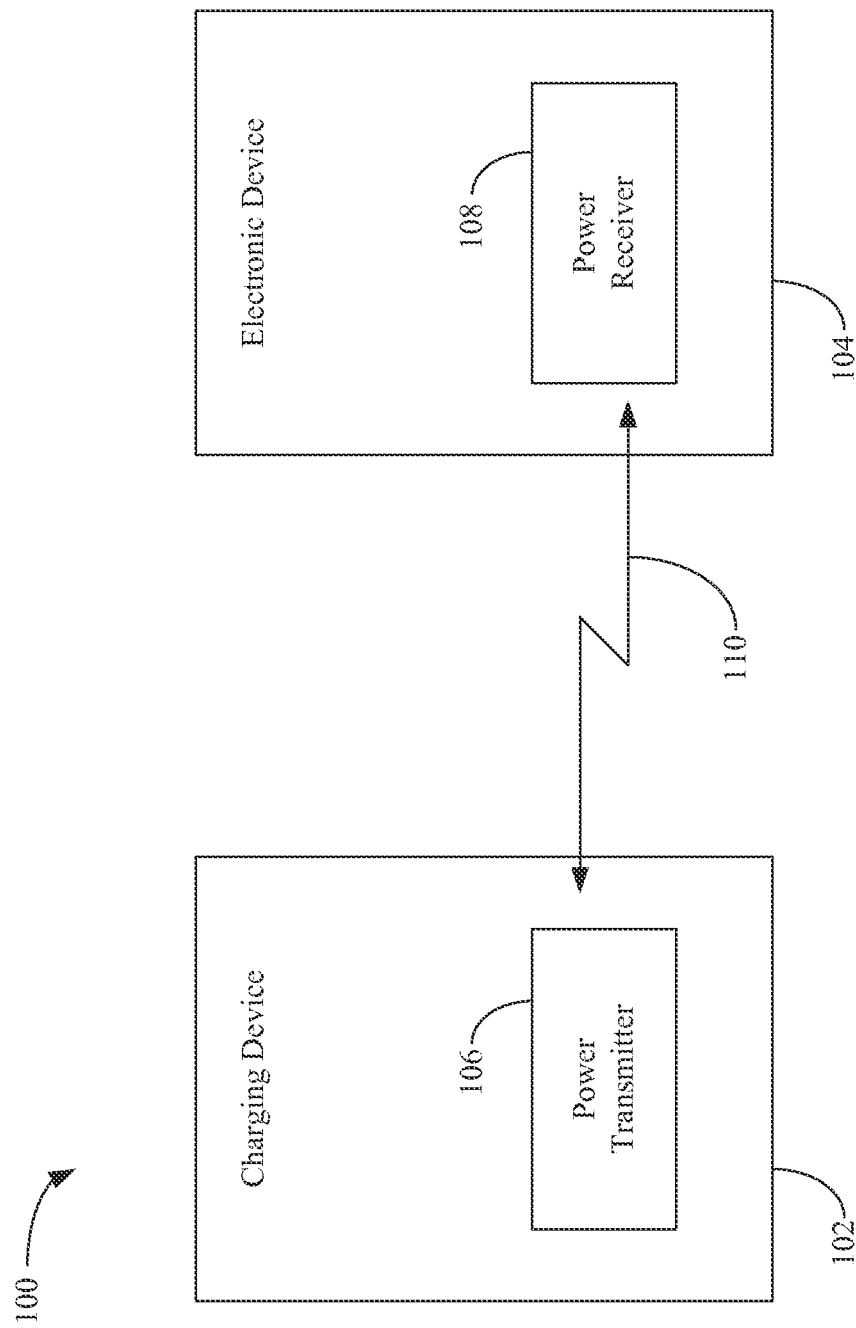
FIG. 1 is a block diagram of an example wireless power transfer system in accordance with an embodiment.

The features and advantages of the subject matter of the present application will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Further, descriptive terms used herein such as "about," "approximately," and "substantially" have equivalent meanings and may be used interchangeably.

Still further, the terms "coupled" and "connected" may be used synonymously herein, and may refer to physical, operative, electrical, communicative and/or other connections between components described herein, as would be understood by a person of skill in the relevant art(s) having the benefit of this disclosure.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner.

II. Example Embodiments

A wireless transmitter is described herein that provides power wirelessly to an apparatus with high efficiency. For example, the wireless power transmitter may include a class E amplifier that is used as a gate driver for a main power amplifier. This advantageously enables power to be transmitted wirelessly with a 100% theoretical power efficiency and with minimal power loss. Furthermore, electromagnetic interference (EMI) issues are reduced because only low orders of harmonics are applied to the gate of the main power amplifier. A system that incorporates such a wireless transmitter and methods of operating the same are also described herein.

In particular, an apparatus is described herein. The apparatus includes a gate driver, a transformer, and a power amplifier. The gate driver is configured to convert a first oscillating signal to a second oscillating signal. The first oscillating signal is a square wave signal and the second oscillating signal is a sinusoidal wave signal. The transformer is configured to convert the second oscillating signal to a differential pair of signals. The power amplifier comprises at least a gate terminal. A signal of the differential pair of signals is coupled to the gate terminal of the power amplifier.

In accordance with an embodiment, the apparatus includes a mode selector that is configured to adjust a frequency of the first oscillating signal.

In accordance with another embodiment, the apparatus includes a mode selector that is configured to adjust an amplitude of the first oscillating signal.

In accordance with a further embodiment, the power amplifier is coupled to an output stage that is configured to provide power wirelessly to a second apparatus. An amount of the power provided wirelessly to the second apparatus may be based at least on one of a frequency and an amplitude of the first oscillating signal.

In accordance with yet another embodiment, the apparatus includes a filter circuit that is configured to filter the second oscillating signal before the second oscillating signal is converted to the differential pair of signals.

In accordance with yet a further embodiment, the gate driver of the apparatus is a Class E amplifier.

In accordance with yet another embodiment, the apparatus includes second power amplifiers(s) that each include a gate terminal. A signal of the differential pair of signals may be coupled to the gate terminal of each of the second power amplifier(s).

A method is also described herein. In accordance with the method, a first oscillating signal is converted to a second oscillating signal. The first oscillating signal is a square wave signal and the second oscillating signal is a sinusoidal wave signal. The second oscillating signal is converted to a differential pair of signals. A voltage is applied to a gate terminal of a power amplifier by coupling a signal of the differential pair of signals to the gate terminal.

In accordance with an embodiment, the frequency of the first oscillating signal is adjusted by a mode selector.

In accordance with another embodiment, the amplitude of the first oscillating signal is adjusted by a mode selector.

In accordance with a further embodiment, power is wirelessly provided to an apparatus by an output stage coupled to the power amplifier. An amount of the power wirelessly provided to the apparatus may be based at least on one of a frequency and an amplitude of the first oscillating signal.

In accordance with yet another embodiment, the second oscillating signal is filtered, and the filtered, second oscillating signal is converted to the differential pair of signal.

In accordance with yet a further embodiment, the first oscillating signal is converted to the second oscillating signal by a Class E amplifier.

In accordance with yet another embodiment, a respective voltage is applied to second gate terminal(s) of second power amplifier(s) via the signal of the differential pair of signals.

A charging device is further described herein. The charging device includes a power transmitter that is configured to wirelessly provide power to an apparatus via a resonator. The power transmitter includes a gate driver, a transformer, and a power amplifier. The gate driver is configured to convert a first oscillating signal to a second oscillating signal. The first oscillating signal is a square wave signal and the second oscillating signal is a sinusoidal wave signal. The transformer is configured to convert the second oscillating signal to a differential pair of signals. The power amplifier comprises at least a gate terminal. A signal of the differential pair of signals is coupled to the gate terminal of the power amplifier.

In accordance with an embodiment, the charging device includes a mode selector that is configured to adjust a frequency of the first oscillating signal.

In accordance with another embodiment, the charging device includes a mode selector that is configured to adjust an amplitude of the first oscillating signal.

In accordance with a further embodiment, the charging device includes a filter circuit that is configured to filter the second oscillating signal before the second oscillating signal is converted to the differential pair of signals.

In accordance with yet another embodiment, the gate driver of the charging device is a Class E amplifier In accordance with yet a further embodiment, the charging device includes second power amplifier(s), each comprising a gate terminal. The signal of the differential pair of signals is coupled to the gate terminal of each of the second power amplifier(s).

FIG. 1 depicts a block diagram of an example wireless power transfer system 100 in accordance with an embodiment. As shown in FIG. 1, wireless power transfer system 100 comprises a charging device 102 and an electronic device 104. Charging device 102 is configured to wirelessly transfer power to electronic device 104.

As shown in FIG. 1, charging device 102 includes a power transmitter 106. Power transmitter 106 may be configured to wirelessly transfer power in accordance with a resonant inductive coupling technique. For example, in an embodiment, power transmitter 106 utilizes magnetically-coupled resonator(s) to wirelessly transfer power over inductive link 110. In further accordance with such an embodiment, a resonator (not shown) coupled to power transmitter 106 generates a non-radiative magnetic field oscillating at megahertz (MHz) frequencies. The non-radiative field mediates a power exchange with a resonator (not shown) attached to a power receiver 108 included in electronic device 104, which is specially designed to resonate with the field. The resonant nature of the process facilitates a strong interaction between charging device 102 and electronic device 104 via inductive link 110, while the interaction with the rest of the environment is weak. Power that is not picked up by electronic device 104 remains bound to the vicinity of the charging device 102, instead of being radiated into the environment and lost.

Power transmitter 106 may be configured to generate the non-radiative magnetic field by applying an oscillating signal to the resonator, which causes the resonator to generate a non-radiative magnetic field that oscillates at the frequency of the oscillating signal. In accordance with an embodiment, the oscillating signal that is provided to the resonator of charging device 102 may be amplified by a power amplifier (not shown) before it is provided thereto. The power amplifier may include a gate that is driven by a gate driver. In accordance with an embodiment, the gate driver is a class E amplifier, which provides significant advantages over traditional gate drivers. Such advantages include a 100% theoretical power efficiency, minimal power loss, and a reduction in EMI due to the application of low-order harmonics to the gate of the power amplifier.

Electronic device 104 may include a battery (not shown) coupled to power receiver 108. Power receiver 108 may be configured to wirelessly receive power from power transmitter 106 and use such power to recharge the battery coupled thereto. Examples of electronic device 104 include, but are not limited to, laptop computers, mobile phones, cameras, media players, gaming controllers, wireless headsets, wireless tools/appliances (e.g., wireless toothbrushes, electric shavers, etc.).

Figure 2:
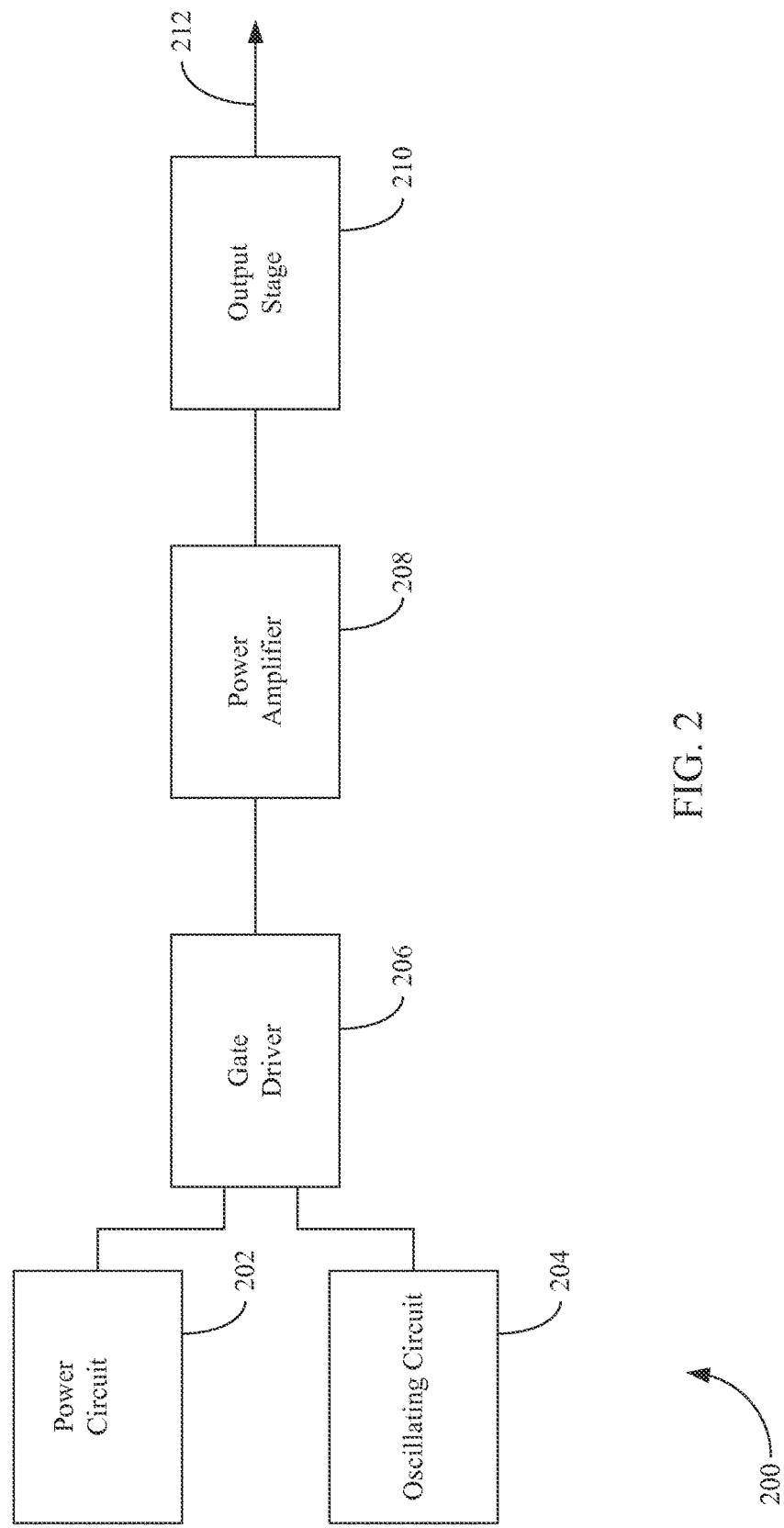
FIG. 2 is a block diagram of an example power transmitter in accordance with an embodiment.

FIG. 2 depicts a block diagram of an example power transmitter 200 in accordance with an embodiment. Power transmitter 200 may be an example of power transmitter 106, as shown in FIG. 1. As shown in FIG. 2, power transmitter 200 includes a power circuit 202, an oscillating circuit 204, a gate driver 206, a power amplifier 208 and an output stage 210. Power circuit 202 may be coupled to a power source (not shown) and may be configured to receive a voltage that is provided to gate driver 206. In accordance with an embodiment, the voltage is a direct current (DC) voltage. Power circuit 202 may be configured to suppress noise from the voltage received before providing the voltage to gate driver 206.

Oscillating circuit 204 may be configured to provide an oscillating signal. The oscillating signal may be provided by a crystal oscillator, a phase-locked loop (PLL), and/or the like, which may or may not be included in power transmitter 200. In accordance with an embodiment, the oscillating signal may be a square wave signal and have a frequency suitable for resonant inductive coupling (for example, 6.78 MHz, 13.56 MHz, etc.). The oscillating signal may be provided to gate driver 206.

Gate driver 206 may be configured to provide a signal that drives a gate of power amplifier 208. The signal may be obtained by converting the square wave signal into a sinusoidal wave signal by a resonant inductor-capacitor (LC) circuit included therein. In accordance with an embodiment, gate driver 206 is a switching amplifier such as a Class-E amplifier. The sinusoidal wave signal may be provided to power amplifier 208.

Power amplifier 208 may be configured to amplify the sinusoidal wave signal received from gate driver 206 for wireless transmission to increase the power transmission efficiency thereof. For example, power amplifier 208 may comprise a switching device (e.g., a transistor such as a metal oxide semiconductor field effect transistor (MOSFET)) that includes a drain terminal, a source terminal and a gate terminal. A voltage may be applied to the drain terminal, the source terminal may be coupled to ground, and the sinusoid wave signal received from gate driver 206 (which is obtained using the oscillating signal provided by oscillating signal 204) may be applied to the gate terminal, thereby causing the sinusoidal wave signal to be amplified voltage.

Output stage 210 may be configured to provide power 212 wirelessly to another apparatus (e.g., electronic device 104, as shown in FIG. 1). In accordance with an embodiment, output stage 210 includes a resonator (e.g., a coil) to which the amplified sinusoidal wave signal provided by power amplifier 208 is applied. The amplified sinusoidal wave signal causes the resonator to resonate at the frequency of the amplified sinusoidal wave signal, thereby causing a magnetic field to be generated that is used to wirelessly transfer power from power transmitter 200 to a power receiver (e.g., power receiver 108, as shown in FIG. 1)

Figure 3:
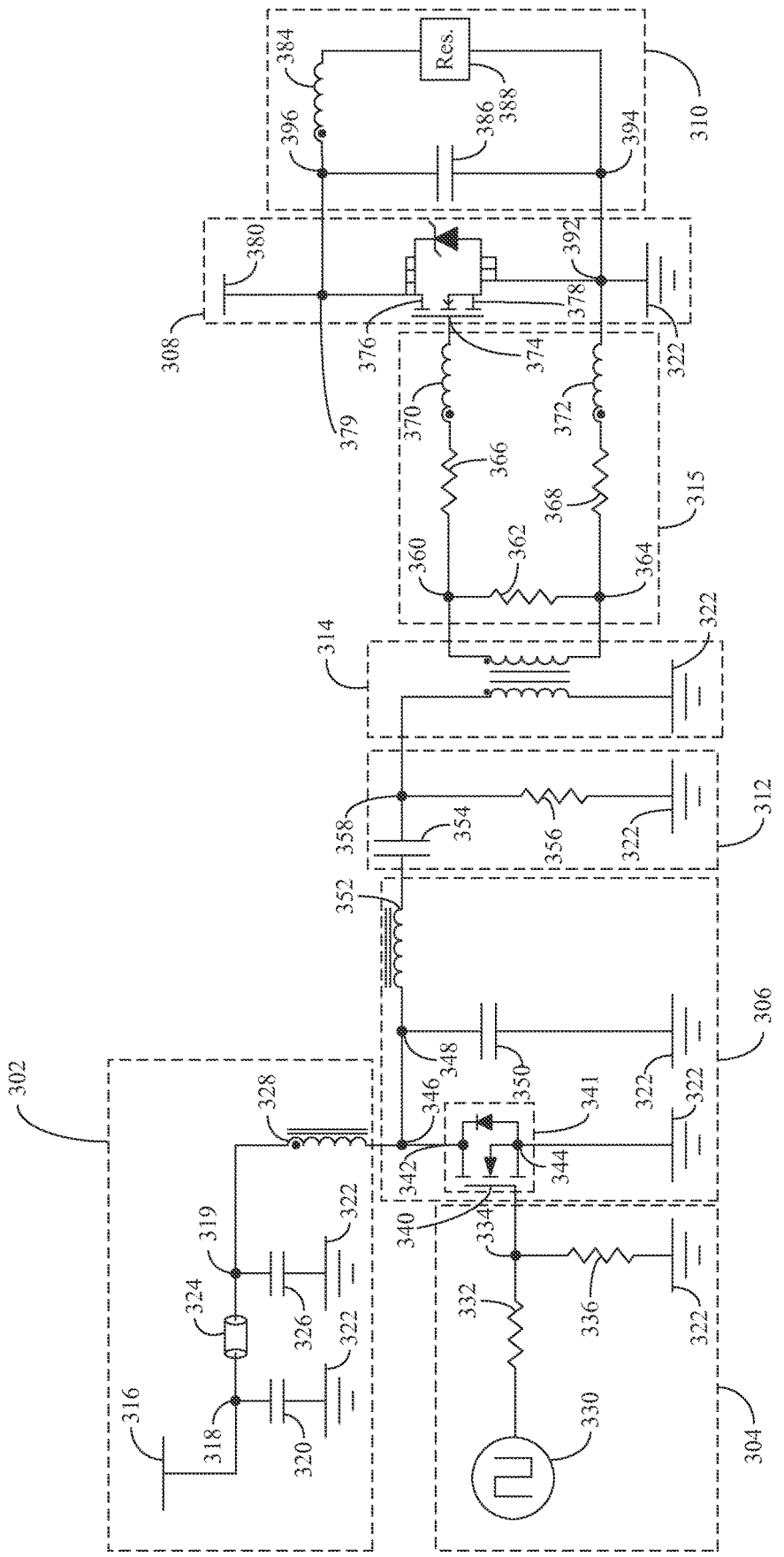
FIG. 3 is a circuit diagram of an example power transmitter in accordance with an embodiment.

FIG. 3 depicts a circuit diagram of an example power transmitter 300 in accordance with an embodiment. Power transmitter 300 may be an example of power transmitter 106, as shown in FIG. 1, or power transmitter 200, as shown in FIG. 2. As shown in FIG. 3, power transmitter 300 includes a power circuit 302, an oscillating circuit 304, a gate driver 306, a power amplifier 308, an output stage 310, a filter circuit 312, a transformer 314 and an adjustment circuit 315. Power circuit 302 may be an example of power circuit 202, oscillating circuit 304 may be an example of oscillating circuit 204, gate driver 306 may be an example of gate driver 206, power amplifier 308 may be an example of power amplifier 208 and output stage 310 may be an example of output stage 210, as respectively shown in FIG. 2.

A voltage may be applied to power circuit 302 by a power source 316 that is coupled thereto. For example, a voltage may be applied to a node 318 of power circuit 302 by power source 316. As shown in FIG. 2, power circuit 302 includes a first capacitor 320, a filter 324, a second capacitor 326 and a first inductor 328. Power circuit 302 is coupled to power source 316 via node 318 of power circuit 302. First capacitor 320 is coupled between node 318 and a ground 322. Filter 324 is coupled between node 318 and a node 319 of power circuit 302. Second capacitor 326 is coupled between node 319 and ground 322. First inductor 328 is coupled to node 319 and gate driver 306 (e.g., to a node 346 of gate driver 306).

First capacitor 320, filter 324, second capacitor 326 and first inductor 328 may be configured to, as a whole or in any combination, suppress noise and/or higher-frequency alternating current (AC) in voltage circuit 302, while allowing lower frequency or direct current (DC) to pass through. An example of filter 324 includes, but is not limited to, a ferrite bead. Examples of first inductor 328 include, but are not limited to a ferromagnetic-core or an iron-core inductor. The noise-suppressed voltage is applied to gate driver 306 (e.g., via node 346 of gate driver 306). In accordance with an embodiment, first capacitor 320, second capacitor 326 and/ or first inductor 328 are fixed components, and thus, the characteristic values thereof are not electrically and/or mechanically adjustable. In accordance with another embodiment, first capacitor 320, second capacitor 326 and/ or first inductor 328 are variable components, and thus, the characteristic values thereof are electrically and/or mechanically adjustable.

Oscillating circuit 304 may include an oscillating signal source 330 that generates an oscillating signal. Oscillating signal source 330 may be a crystal oscillator, a phase-locked loop (PLL), and/or the like, which may or may not be included in power transmitter 300. In accordance with an embodiment, the oscillating signal may be a square wave and have a frequency suitable for resonant inductive coupling (for example, 6.78 MHz, 13.56 MHz, etc.).

As shown in FIG. 3, oscillating circuit 304 may include a first resistor 332 and a second resistor 336. First resistor 332 is coupled between oscillating signal source 330 and a node 334 of oscillating circuit 304. Second resistor 332 is coupled between node 334 and ground 322. First resistor 332 and second resistor 336 may be configured to, as a whole or in any combination, reduce a current and/or lower a voltage level of the oscillating signal such that it is suitable for driving a gate terminal (i.e., gate terminal 340) of a switching element (i.e., switching element 341) of gate driver 306. In accordance with an embodiment, first resistor 332 and/or second resistor 336 are fixed components, and thus, the characteristic values thereof are not electrically and/or mechanically adjustable. In accordance with another embodiment, first resistor 332 and/or second resistor 336 are variable components, and thus, the characteristic values thereof are electrically and/or mechanically adjustable.

Gate driver 306 is configured to provide a signal that drives a gate terminal (e.g., a gate terminal 374) of power amplifier 308. The signal may be obtained by converting a square wave signal received from oscillating circuit 304 into a sinusoidal wave signal by a resonant LC circuit included therein. For example, as shown in FIG. 3, gate driver 306 includes a switching element 341, a third capacitor 350 and a second inductor 352. Switching element 341 includes gate terminal 340, a source terminal 344 and a drain terminal 342. Gate terminal 340 is coupled to node 334 of oscillating circuit 304. Third capacitor 350 is coupled between a node 348 of gate driver 306 and ground 322. Second inductor 352 is coupled between node 348 and filter circuit 312. Node 342 is coupled to node 348. Third capacitor 350 and second inductor 352 form the resonant LC circuit. As shown in FIG. 3, second inductor 352 may be a ferromagnetic-core or an iron-core inductor. It is noted however that other types of inductors may be used as would be apparent to one of skill in the art having benefit of this disclosure.

In accordance with an embodiment, gate driver 306 is a class-E amplifier. In accordance with this embodiment, switching element 341 is configured as a switching amplifier that is driven by the square wave signal received from oscillating circuit 304 and is coupled to the resonant LC circuit formed by third capacitor 350 and second inductor 352. The square wave signal is applied to gate terminal 340. When switching element 341 is activated, the current through first inductor 328 is relatively high and flows through switching element 341 to ground 322. When switching element 341 is deactivated, the relatively high current flows from first inductor 328 to the resonant LC circuit (i.e., third capacitor 350 and second inductor 352), and none of the current flows through switching element 341. Moreover, switching element 341 is configured such that it is activated when there is no voltage between drain terminal 342 and source terminal 344, which eliminates switching power losses. As such, gate driver 306 provides 100% theoretical power efficiency (e.g., 90-100% power efficiency) and minimal power loss.

In accordance with an embodiment, switching element 341 is an n-channel depletion MOSFET (as shown in FIG. 3). In accordance with such an embodiment, switching element 341 may be activated when the square wave signal generated by oscillating circuit 304 is asserted high (e.g., a '1' (logical high signal value)) and deactivated when the square wave signal is asserted low (e.g., a '0' (logical low signal value)). It is noted however that other types of switching elements may be used (e.g., a p-channel depletion MOSFET) as would be apparent to one of skill in the art having benefit of this disclosure.

In accordance with an embodiment, third capacitor 350 and/or second inductor 352 are fixed components, and thus, the characteristic values thereof are not electrically and/or mechanically adjustable. In accordance with another embodiment, third capacitor 350 and/or second inductor 352 are variable components, and thus, the characteristic values thereof are electrically and/or mechanically adjustable.

Filter circuit 358 is configured to receive the sinusoidal wave signal generated by gate driver 306 and to generate a filtered version thereof. As shown in FIG. 3, filter circuit 348 includes a fourth capacitor 354 and a third resistor 356. Fourth capacitor 354 is coupled between second inductor 352 of gate driver 306 and a node 358 of filter circuit 312. Third resistor 356 is coupled between node 358 and ground 322.

Fourth capacitor 358 and third resistor 356 may be configured to, as a whole or in any combination, suppress high-order harmonics and/or other undesired frequencies from the sinusoidal wave signal generated by gate driver 306. This advantageously results in a reduction in EMI due to the application of low-order harmonics to the gate (e.g., gate terminal 374) of power amplifier 308, as described below. In accordance with an embodiment, the values of fourth capacitor 358 and third resistor 356 are fixed. In accordance with another embodiment, the values of fourth capacitor 358 and third resistor 356 are adjustable. The filtered, sinusoidal wave signal generated by filter circuit 312 is provided to transformer 314.

Transformer 314 is coupled to filter circuit 312 via node 358 and is also coupled to ground 322. Transformer 314 may be configured to convert the filtered, sinusoidal wave signal generated by filter circuit 312 into a differential pair of signals. For example, transformer 314 may convert the filtered, sinusoidal wave signal to a differential pair of sinusoidal wave signals. The differential pair of sinusoidal wave signals is provided to adjustment circuit 315. For example, as shown in FIG. 3, a first sinusoidal wave signal of the differential pair of sinusoidal wave signals is coupled to a node 360 of adjustment circuit 315, and a second sinusoidal wave signal of the differential pair of sinusoidal wave signals is coupled to a node 364 of adjustment circuit 315.

Adjustment circuit 315 may be configured to adjust the amplitude of one or more sinusoidal wave signals of the differential pair of sinusoidal wave signals such that they are suitable for driving gate terminal 374 of power amplifier 308. As shown in FIG. 3, adjustment circuit 315 includes a fourth resistor 362, a fifth resistor 366, a sixth resistor 368, a third inductor 370 and a fourth inductor 372. Fourth resistor 362 is coupled between node 360 and node 364. Fifth resistor 366 is coupled between node 360 and third inductor 370. Sixth resistor 368 is coupled between node 364 and fourth inductor 372. Third inductor 370 is coupled between fifth resistor 366 and gate terminal 374 of power amplifier 308. Fourth inductor 372 is coupled between sixth resistor 368 and a source terminal 378 of power amplifier 308.

Fourth resistor 362, fifth resistor 366, sixth resistor 368, third inductor 370 and fourth inductor 372 may be configured to, as a whole or in any combination, adjust the amplitude of one or more sinusoidal wave signals of the differential pair of sinusoidal wave signals generated by transformer 314. The first sinusoidal wave signal of the differential pair of sinusoidal wave signals is applied to gate terminal 374 of power amplifier 308, and the second sinusoidal wave signal of the differential pair of sinusoidal wave signals is applied to source terminal 378 of power amplifier 308.

In accordance with an embodiment, fourth resistor 362, fifth resistor 366, sixth resistor 368, third inductor 370 and/or fourth inductor 372 are fixed components, and thus, the characteristic values thereof are not electrically and/or mechanically adjustable. In accordance with another embodiment, fourth resistor 362, fifth resistor 366, sixth resistor 368, third inductor 370 and/or fourth inductor 372 are variable components, and thus, the characteristic values thereof are electrically and/or mechanically adjustable.

Power amplifier 308 may be configured to amplify the first sinusoidal wave signal of the differential pair of sinusoidal wave signals for wireless transmission to increase the power transmission efficiency thereof. For example, as shown in FIG. 3, power amplifier 308 may comprise a switching device that includes gate terminal 374, source terminal 378 and a drain terminal 376. The first sinusoidal wave signal of the differential pair of sinusoidal wave signals (which has the same frequency as the oscillating signal provided by oscillating circuit 304) is coupled to gate terminal 374. Power source 380 is coupled to drain terminal 376 via a node 379 of power amplifier 308. Source terminal 378 is coupled to ground 322 via a node 392 of power amplifier 308. In accordance with an embodiment, an inductor may be coupled between power source 380 and drain terminal 376 and/or between source terminal 378 and ground 322 to block-higher frequency AC, while allowing lower frequency or DC to pass through to power amplifier 308. The amplified, sinusoidal wave signal is provided to output stage 310.

As shown in FIG. 3, power amplifier 308 comprises an n-channel MOSFET. It is noted however that other types of switching elements may be used (e.g., a p-channel depletion MOSFET) as would be apparent to one of skill in the art having benefit of this disclosure.

Output stage 310 is coupled to power amplifier 308 via a coupling between a node 396 of output stage 310 and node 379 of power amplifier 308 and a node 394 of output stage 310 and node 392 of power amplifier 308. Output stage 310 may be configured to provide power wirelessly to another apparatus (e.g., electronic device 104, as shown in FIG. 1). In accordance with an embodiment, output stage 310 includes a fifth inductor 384, a fifth capacitor 386 and a resonator 388. Fifth inductor 384 is coupled between node 396 and resonator 398. Fifth capacitor 386 is coupled between node 394 and node 396. Resonator 388 is coupled between fifth inductor 384 and node 394.

The amplified, sinusoidal wave signal provided by power amplifier 308 is applied to resonator 388, which causes resonator 388 to resonate at the frequency of the amplified, sinusoidal wave signal. This causes a magnetic field to be generated that is used to transfer power from power transmitter 300 to a power receiver (e.g., power receiver 108, as shown in FIG. 1). Fifth inductor 384 and fifth capacitor 386 may be configured to, as a whole or in any combination, to match the impedance of power transmitter 300 to resonator 388 to maximize the power transfer from resonator 388.

In accordance with an embodiment, fifth inductor 384 and/or fifth capacitor 386 are fixed components, and thus, the characteristic values thereof are not electrically and/or mechanically adjustable. In accordance with another embodiment, fifth inductor 384 and/or fifth capacitor 386 are variable components, and thus, the characteristic values thereof are electrically and/or mechanically adjustable.

Figure 4:
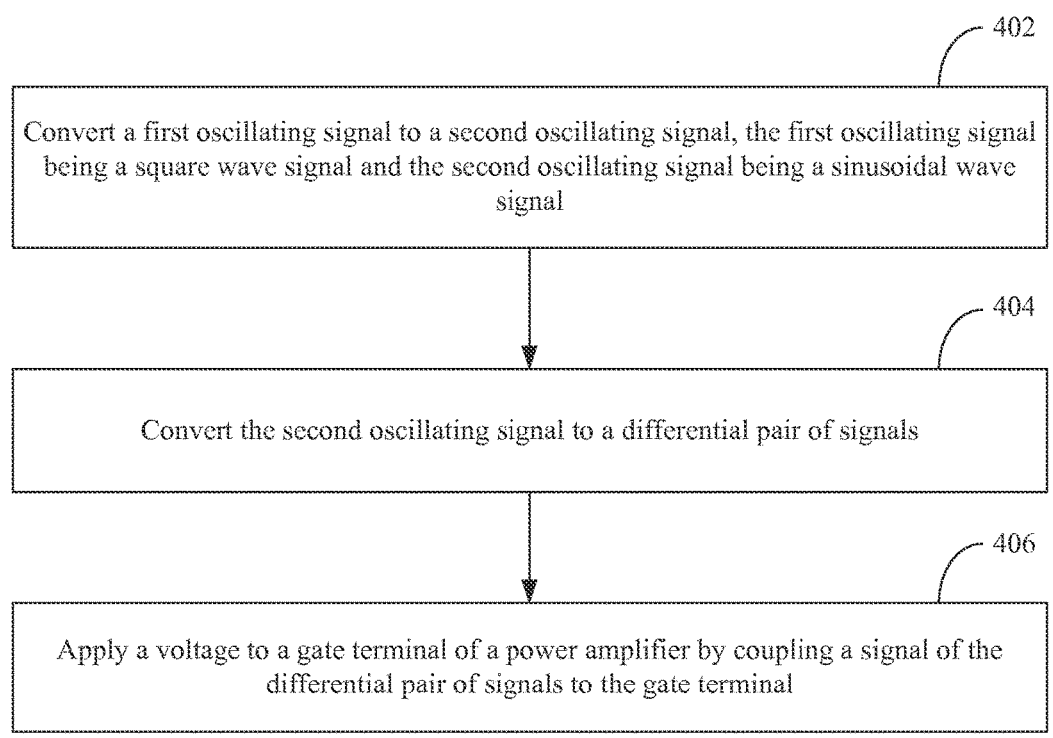
FIG. 4 depicts a flowchart of an example method for providing power wirelessly in accordance with an embodiment.

Accordingly, in embodiments, system 300 may operate in various ways to provide power wirelessly. For example, FIG. 4 depicts a flowchart 400 of an example method for transmitting power wirelessly in accordance with an example embodiment. The method of flowchart 400 will now be described with continued reference to system 300 of FIG. 3, although the method is not limited to that implementation. Other structural and operational embodiments will be apparent to persons skilled in the relevant art(s) based on the discussion regarding flowchart 400 and system 300.

As shown in FIG. 4, the method of flowchart 400 begins at step 402, in which a first oscillating signal is converted to a second oscillating signal. The first oscillating signal may be a square wave signal, and the second oscillating signal may be a sinusoidal wave signal. For example, with reference to FIG. 3, the resonant LC circuit (which comprises third capacitor 350 and second inductor 352) of gate driver 306 converts a square wave signal received from oscillating circuit 304 to a sinusoidal wave signal. In accordance with an embodiment, gate driver 306 is a Class E amplifier.

At step 404, the second oscillating signal is converted to a differential pair of signals. For example, as discussed above in reference to FIG. 3, transformer 314 converts the sinusoidal wave signal received from gate driver 306 to a differential pair of sinusoidal wave signals.

In accordance with an embodiment, the sinusoidal wave signal is filtered before being provided to transformer 314. For example, as discussed above in reference to FIG. 3, the sinusoidal wave signal is provided to filter circuit 312. Filter circuit 312 may be configured to suppress high-order harmonics and/or other undesired frequencies from the sinusoidal wave signal. The filtered, sinusoidal wave signal is provided to transformer 314, and transformer 314 converts the filtered, sinusoidal wave signal to the differential pair of sinusoidal wave signals.

At step 406, a voltage is applied to a gate terminal of a power amplifier by coupling a signal of the differential pair of signals to the gate terminal. For example, as discussed above in reference to FIG. 3, a voltage is applied to gate terminal 374 of power amplifier 308 by coupling the first sinusoidal wave signal of the differential pair of sinusoidal wave signals to gate terminal 374.

As shown in FIG. 3, power amplifier 308 is coupled to output stage 310, which wirelessly provides power to an apparatus (e.g., electronic device 104, as shown in FIG. 1) via resonator 388. The amount of power wirelessly provided to the apparatus may be based at least on one of a frequency and an amplitude of the first oscillating signal provided by oscillating circuit 304.

In accordance with an embodiment, the amplitude of the first signal of the differential pair of sinusoidal wave signals is adjusted before being provided to gate terminal 374 of power amplifier 308. For example, as discussed above in reference to FIG. 3, the first sinusoidal wave signal of the differential pair of sinusoidal wave signals is provided to adjustment circuit 315, and adjustment circuit 315 adjusts the amplitude of the first sinusoidal wave signal of the differential pair of sinusoidal wave signals such that it is suitable for driving gate terminal 374.

III. Other Embodiments

Figure 5:
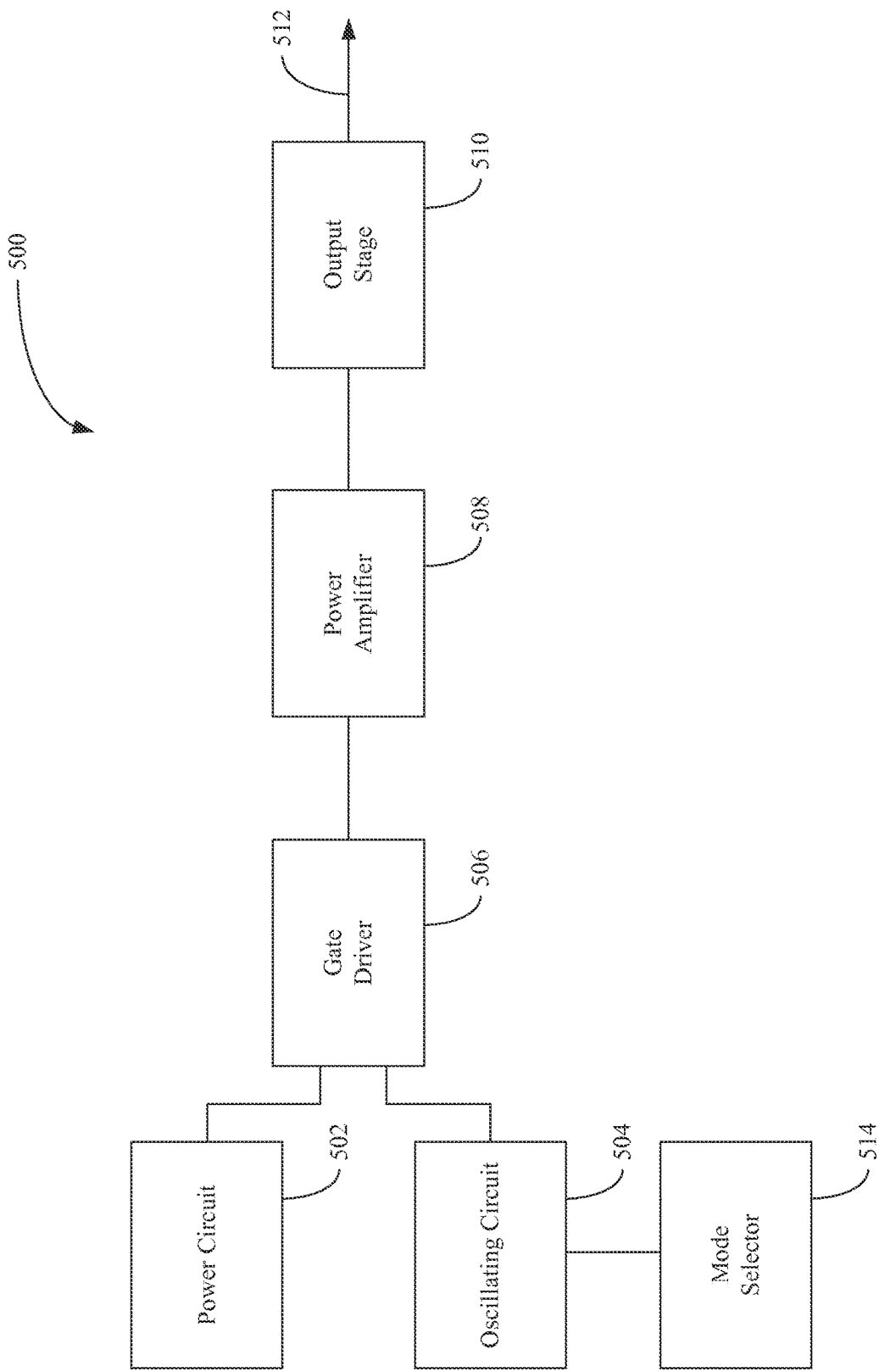
FIG. 5 is a block diagram of an example power transmitter in accordance with another embodiment.

FIG. 5 depicts a block diagram of an example power transmitter 500 in accordance with another embodiment. Power transmitter 500 may be an example of power transmitter 106, as shown in FIG. 1, power transmitter 200, as shown in FIG. 2, or power transmitter 300, as shown in FIG. 3. As shown in FIG. 5, power transmitter 500 includes a power circuit 502, an oscillating circuit 504, a gate driver 506, a power amplifier 508, an output stage 510 and a mode selector 514. Power circuit 502 may be an example of power circuit 202 or power circuit 302, oscillating circuit 504 may be an example of oscillating circuit 204 or oscillating circuit 304, gate driver 506 may be an example of gate driver 206 or gate driver 306, power amplifier 508 may be an example of power amplifier 208 or power amplifier 308 and output stage 510 may be an example of output stage 210 or output stage 310, as respectively shown in FIGS. 2 and 3.

Power circuit 502, oscillating circuit 504, gate driver 506, power amplifier 508, and output stage 510 operate in a similar manner to like-named elements described above with reference to FIGS. 2 and 3 to provide power 512 wirelessly to another apparatus. Mode selector 514 may be configured to adjust a frequency of the oscillating signal provided by oscillating circuit 504. The frequency may be adjusted in response to receiving a first control signal during operation of power transmitter 500. The frequency may be adjusted to wirelessly provide power to apparatuses that are configured to receive power at different frequencies. In accordance with an embodiment, the frequency may be adjusted to any frequency suitable for resonant inductive coupling (for example, 6.78 MHz, 13.56 MHz, etc.).

Mode selector 514 may also be configured to adjust the amount of power wirelessly transmitted by power transmitter 500. For example, mode selector 514 may be configured to adjust an amplitude of the oscillating signal provided by oscillating circuit 504. The amplitude may be adjusted in response to receiving a second control signal during operation of power transmitter 500. The amplitude may be adjusted to wirelessly provide power to apparatuses that are configured to receive power at different levels.

Figure 6:
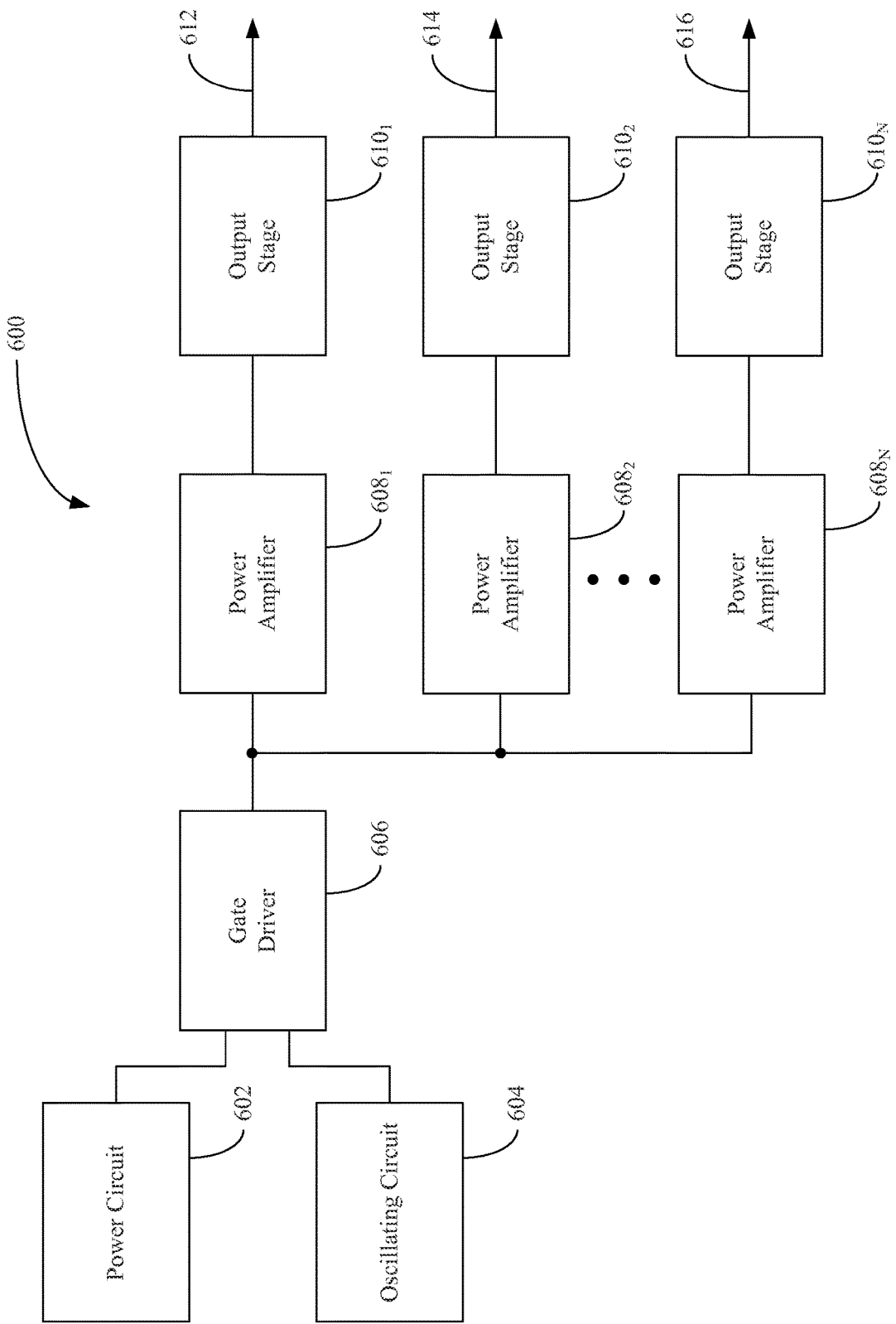
FIG. 6 is a block diagram of an example power transmitter that is configured to provide power wirelessly to a plurality of apparatuses in accordance with an embodiment.

FIG. 6 depicts a block diagram of an example power transmitter 600 that is configured to provide power wirelessly to a plurality of apparatuses in accordance with an embodiment. Power transmitter 600 may be an example of power transmitter 106, as shown in FIG. 1, power transmitter 200, as shown in FIG. 2, power transmitter 300, as shown in FIG. 3, or power transmitter 500, as shown in FIG. 5. As shown in FIG. 6, power transmitter 600 includes power circuit 602, oscillating circuit 604, gate driver 606, power amplifiers $608_{1-N}$, and output stages $610_{1-N}$. Power circuit 602 may be an example of power circuit 202, power circuit 302 or power circuit 502, oscillating circuit 604 may be an example of oscillating circuit 204, oscillating circuit 304 or oscillating circuit 504, gate driver 606 may be an example of gate driver 206, gate driver 306 or gate driver 506, power amplifier $608_{1-N}$ may each be an example of power amplifier 208, power amplifier 308 or power amplifier 508 and output stages $610_{1-N}$ may each be an example of output stage 210, output stage 310 or output stage 510, as respectively shown in FIGS. 2, 3 and 5.

Power circuit 602, oscillating circuit 604, gate driver 606, power amplifiers $608_{1-N}$ and output stages $610_{1-N}$ operate in a similar manner as described above with reference to like-named elements in FIGS. 2, 3 and 5. However, as shown in FIG. 6, gate driver 606 is coupled to each of power amplifiers $608_{1-N}$. In accordance with such an embodiment, the sinusoidal wave signal provided by gate driver 606 is provided to each of power amplifiers $608_{1-N}$. In accordance with an embodiment where the sinusoidal wave signal is converted into a differential pair of sinusoidal wave signals (as described above with respect to FIG. 3), the differential pair of sinusoidal wave signals are provided to each of power amplifiers $608_{1-N}$. For example, a first sinusoidal wave signal of the differential pair of sinusoidal wave signals is coupled to a gate terminal (e.g., gate terminal 374, as shown in FIG. 3) of each of power amplifiers $608_{1-N}$, and a second sinusoidal wave signal of the differential pair of sinusoidal wave signals is coupled to a source terminal (e.g., source terminal 378, as shown in FIG. 3) of each of power amplifiers $608_{1-N}$.

Each of power amplifiers $608_{1-N}$ is coupled to a respective output stage $610_{1-N}$. Each of output stages $610_{1-N}$ is configured to provide power wirelessly to another apparatus inductively coupled thereto. Each of output stages $610_{1-N}$ may provide power in accordance with the amplified voltage provided by its corresponding power amplifier and the frequency of the oscillating signal provided by oscillating circuit 204. For example, output stage $610_1$ provides power 612 based on the amplified voltage provided by power amplifier $608_1$, output stage $610_2$ provides power 614 based on the amplified voltage provided by power amplifier $608_2$ and output stage $610_N$ provides power 616 based on the amplified voltage provided by power amplifier $608_N$.

IV. Conclusion

Embodiments are not limited to the functional blocks, detailed examples, steps, order or the entirety of subject matter presented in the figures, which is why the figures are referred to as exemplary embodiments.

A device, as defined herein, is a machine or manufacture as defined by 35 U.S.C. §101. A device may comprise, for example but not limited to, an amplifier, driver, wireless device, communications device, receiver, transmitter, transceiver, etc. Devices may be digital, analog or a combination thereof. Devices may be implemented with any semiconductor technology, including one or more of a Bipolar Junction Transistor (BJT), a heterojunction bipolar transistor (HBT), a MOSFET device, a metal semiconductor field effect transistor (MESFET) or other transconductor or transistor technology device. Such alternative devices may require alternative configurations other than the configuration illustrated in embodiments presented herein.

Techniques, including methods, described herein may be implemented in hardware (digital and/or analog) or a combination of hardware, software and/or firmware. Techniques described herein may be implemented in one or more components. Embodiments may comprise computer program products comprising logic (e.g., in the form of program code or software as well as firmware) stored on any computer useable medium, which may be integrated in or separate from other components. Such program code, when executed in one or more processors, causes a device to operate as described herein. Devices in which embodiments may be implemented may include storage, such as storage drives, memory devices, and further types of computer-readable media. Examples of such computer-readable media include, but are not limited to, a hard disk, a removable magnetic disk, a removable optical disk, flash memory cards, digital video disks, random access memories (RAMs), read only memories (ROM), and the like. In greater detail, examples of such computer-readable media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may, for example, store computer program logic, e.g., program modules, comprising computer executable instructions that, when executed, provide and/or maintain one or more aspects of functionality described herein with reference to the figures, as well as any and all components, steps and functions therein and/or further embodiments described herein.

Proper interpretation of subject matter described herein and claimed hereunder is limited to patentable subject matter under 35 U.S.C. §101. Subject matter described in and claimed based on this patent application is not intended to and does not encompass unpatentable subject matter. As described herein and claimed hereunder, a method is a process defined by 35 U.S.C. §101. As described herein and claimed hereunder, each of a circuit, device, apparatus, machine, system, computer, module, media and the like is a machine and/or manufacture defined by 35 U.S.C. §101.

While a limited number of embodiments have been described, those skilled in the art will appreciate numerous modifications and variations there from. Embodiments have been presented by way of example only, and not limitation. It will be apparent to persons skilled in the relevant art(s) that various changes in form and details can be made therein without departing from the spirit and scope of the disclosed technologies. The exemplary appended claims encompass embodiments and features described herein, modifications and variations thereto as well as additional embodiments and features that fall within the true spirit and scope of the disclosed technologies. Thus, the breadth and scope of the disclosed technologies should not be limited by any of the above-described exemplary embodiments, but should be defined only in accordance with the following claims and their equivalents.

What is claimed is:

1. An apparatus, comprising:
a gate driver comprising at least a first gate terminal, the gate driver being configured to convert a first oscillating signal applied to the first gate terminal to a second oscillating signal, the first oscillating signal being a square wave signal and the second oscillating signal being a sinusoidal wave signal; and
a power amplifier comprising at least a second gate terminal, wherein a signal based on the second oscillating signal is coupled to the second gate terminal of the power amplifier.

2. The apparatus of claim 1, further comprising a mode selector that is configured to adjust a frequency of the first oscillating signal.

3. The apparatus of claim 1, further comprising a mode selector that is configured to adjust an amplitude of the first oscillating signal.

4. The apparatus of claim 1, wherein the power amplifier is coupled to an output stage that is configured to provide power wirelessly to a second apparatus, and wherein an amount of the power provided wirelessly to the second apparatus is based at least on one of a frequency and an amplitude of the first oscillating signal.

5. The apparatus of claim 1, further comprising:
one or more second power amplifiers, each comprising a third gate terminal, wherein the signal based on the second oscillating signal is coupled to the third gate terminal of each of the one or more second power amplifiers.

6. The apparatus of claim 1, further comprising:
a transformer configured to convert the second oscillating signal to a differential pair of signals, wherein the signal based on the second oscillating signal is a signal of the differential pair of signals.

7. The apparatus of claim 6, further comprising a filter circuit that is configured to filter the second oscillating signal before the second oscillating signal is converted to the differential pair of signals.

8. A method, comprising:
applying a first oscillating signal to a first gate terminal of a gate driver;
converting, by the gate driver, the first oscillating signal to a second oscillating signal, the first oscillating signal being a square wave signal and the second oscillating signal being a sinusoidal wave signal;
converting the second oscillating signal to a differential pair of signals; and
applying a voltage to a second gate terminal of a power amplifier by coupling a signal of the differential pair of signals to the second gate terminal.

9. The method of claim 8, further comprising:
adjusting a frequency of the first oscillating signal by a mode selector.

10. The method of claim 8, further comprising:
adjusting an amplitude of the first oscillating signal by a mode selector.

11. The method of claim 8, further comprising:
wirelessly providing power to an apparatus by output stage coupled to the power amplifier, wherein an amount of the power wirelessly provided to the apparatus is based at least on one of a frequency and an amplitude of the first oscillating signal.

12. The method of claim 8, wherein converting the second oscillating signal to a differential pair of signals comprises:
filtering the second oscillating signal; and
converting the filtered, second oscillating signal to the differential pair of signals.

13. The method of claim 8, wherein the gate driver is a Class E amplifier.

14. The method of claim 8, further comprising:
applying a respective voltage to one or more third gate terminals of one or more second power amplifiers via the signal of the differential pair of signals.

15. A charging device, comprising:
a power transmitter configured to wirelessly provide power to an apparatus via a resonator, the power transmitter comprising:
a first power amplifier comprising at least a first gate terminal, the first power amplifier being configured to convert a first oscillating signal applied to the first gate terminal to a second oscillating signal, the first oscillating signal being a square wave signal and the second oscillating signal being a sinusoidal wave signal, the first power amplifier being a Class E power amplifier;
a transformer configured to convert the second oscillating signal to a differential pair of signals; and
a second power amplifier comprising at least a second gate terminal, wherein a signal of the differential pair of signals is coupled to the second gate terminal of the second power amplifier.

16. The charging device of claim 15, further comprising a mode selector that is configured to adjust a frequency of the first oscillating signal.

17. The charging device of claim 15, further comprising a mode selector that is configured to adjust an amplitude of the first oscillating signal.

18. The charging device of claim 15, further comprising a filter circuit that is configured to filter the second oscillating signal before the second oscillating signal is converted to the differential pair of signals.

19. The charging device of claim 15, further comprising:
one or more third power amplifiers, each comprising a third gate terminal, wherein the signal of the differential pair of signals is coupled to the third gate terminal of each of the one or more third power amplifiers.

20. The charging device of claim 15, wherein an amount of the power wirelessly provided to the apparatus is based at least on one of a frequency and an amplitude of the first oscillating signal.

* * * * *